US005940001A

United States Patent [19]

Okayasu et al.

[11] Patent Number: 5,940,001

[45] Date of Patent: Aug. 17, 1999

[54] TRANSMISSION AND RECEPTION SYSTEM FOR CONTROLLING LOCKING/UNLOCKING OPERATION OF KEY

[75] Inventors: Yoshisada Okayasu, Kanagawa; Keiji Morise, Chiba; Hiroaki Yamamoto, Tokyo, all of Japan

[73] Assignee: Sony Corporation, Tokyo, Japan

[21] Appl. No.: 08/814,323

[22] Filed: Mar. 11, 1997

[30] Foreign Application Priority Data

Mar. 19, 1996 [JP] Japan .................................... 8-062865

[51] Int. Cl.[6] ....................................................... H04Q 9/00

[52] U.S. Cl. ............................... 340/825.31; 340/825.54; 340/825.69; 340/825.72; 340/636; 455/343; 361/172

[58] Field of Search ......................... 340/825.31, 825.72, 340/825.69, 825.54, 636; 455/343; 361/172

[56] References Cited

U.S. PATENT DOCUMENTS

| | | | |
|---|---|---|---|
| 4,700,186 | 10/1987 | Fujino et al. | 340/825.72 |
| 4,761,644 | 8/1988 | Kawai et al. | 340/825.31 |
| 4,779,090 | 10/1988 | Micznik et al. | 340/825.72 |
| 4,835,531 | 5/1989 | Sato | 340/825.69 |
| 4,881,148 | 11/1989 | Lambropoulos et al. | 361/172 |
| 5,541,585 | 7/1996 | Duhame et al. | 340/825.69 |

FOREIGN PATENT DOCUMENTS 0292217 11/1988 European Pat. Off. .

OTHER PUBLICATIONS

Patent Abstracts of Japan No. JP 03–094309 (Kurahashi).

*Primary Examiner*—Brian Zimmerman
*Assistant Examiner*—Yves Dalencourt
*Attorney, Agent, or Firm*—Jay H. Maioli

[57] ABSTRACT

A transmission and reception system for controlling a locking/unlocking operation of a key includes a transmission section for transmitting a control signal having a predetermined frequency for effecting locking/unlocking of the key, and a reception section for receiving the control signal and effecting driving control of the key in response to the control signal. The reception section includes a carrier detection circuit for detecting a frequency of the control signal and supplies power only to the carrier detection circuit when the control signal is not received.

19 Claims, 14 Drawing Sheets

TRANSMISSION AND RECEPTION SYSTEM FOR CONTROLLING LOCKING/ UNLOCKING OPERATION OF KEY

BACKGROUND OF THE INVENTION

This invention relates to a transmission and reception system for controlling a locking/unlocking operation of a key, and more particularly to a transmission and reception system which uses a radio wave, an infrared ray or the like to control locking or unlocking of a door for a house, a vehicle or the like.

Conventionally, for the locking or unlocking of a door of a house, a vehicle or the like, it is generally known to deliver an instruction using a radio wave, an infrared ray or the like without using a physical key to effect locking or unlocking. FIG. 1 shows a typical known remotely controlled lock apparatus.

Referring to FIG. 1, the remotely controlled lock apparatus is denoted at 50 and includes an electronic lock 52 provided on a door 51, a transmitter 53 for transmitting a radio wave signal, a receiver 54 for receiving the radio wave signal, and a controller 55 for controlling locking or unlocking of the electronic lock 52 in response to the radio wave signal. The electronic lock 52, receiver 54 and controller 55 are connected to each other by a power line 56.

With the remotely controlled lock apparatus 50, if an owner depresses an operation button (not shown) of the transmitter 53 when the owner comes near the door 51, then a radio wave signal including an identification code ID of the owner and so forth is transmitted from the transmitter 53, and the radio wave signal is received by the receiver 54.

After the receiver 54 receives the radio wave signal, it transmits the identification code ID included in the radio wave signal to the controller 55. The controller 55 compares the identification code ID received from the receiver 54 with identification code ID set therein in advance. If the identification code ID of the radio wave signal and the identification code ID set in advance are coincident with each other, then the controller 55 sends a locking or unlocking signal to the electronic lock 52.

The electronic lock 52 is operated for locking or unlocking in response to the locking or unlocking signal so that the door 51 can be locked or unlocked automatically. Also an apparatus wherein a power supply and an electric lock are provided in a door so that locking or unlocking may be performed electrically is known and disclosed, for example, in Japanese Utility Model Registration No. 2,506,280 or Japanese Utility Model Laid-Open Application No. Heisei 1-129454.

However, the conventional remotely controlled lock apparatus 50 having such a construction as shown in FIG. 1 is disadvantageous in that a large space is required because the receiver 54, the controller 55 and so forth must be located, for example, in the inside of a house.

Further, in order to obtain power, for example, a power supply plug must be inserted into a plug socket to receive AC power supply from the outside of the receiver 54. Further, since the receiver 54, the controller 55 and so forth are not formed as a unitary member with the door 51, wiring lines between the door 51, receiver 54, controller 55 and so forth must be taken into consideration. Therefore, the remotely controlled lock apparatus 50 is disadvantageous also in that a large scale and much time are required to install it.

Furthermore, since the receiver 54 is installed in an exposed state, where a button for erasing or registering an identification code ID and so forth are provided on the receiver 54, the remotely controlled lock apparatus 50 is further disadvantageous in terms of safety in that an identification code ID may possibly be erased or registered readily.

On the other hand, as remotely controlled lock apparatus of the type described above become more popular, a still further disadvantage arises in that, when another user in the neighborhood to a user of a certain remotely controlled lock apparatus utilizes locking or unlocking by a radio wave of the same frequency to open or close a door of a house or a vehicle within a range within which the radio wave then reaches the certain remotely controlled lock apparatus, radio interference occurs, resulting in failure to open or close the door of the user of the certain remotely controlled lock apparatus, or the receiver 54 of the certain remotely controlled lock apparatus receives static electricity or an unnecessary signal and a malfunction of the receiver 54 is likely to occur.

Further, since the power supply to the receiver 54 is normally kept on or intermittently turned on, if the remotely controlled lock apparatus 50 is not used for a long period of time, then the power is consumed in vain within the time. The remotely controlled lock apparatus 50 is disadvantageous also in that, as the time within which the power supply is on increases, the frequency in which an unnecessary signal is received increases, resulting in an increase in the rate in which a malfunction occurs.

SUMMARY OF THE INVENTION

It is an object of the present invention to provide a transmission and reception system for controlling a locking/unlocking operation of a key which is simple in construction and does not require a large space.

It is another object of the present invention to provide a transmission and reception system for controlling a locking/unlocking operation of a key which prevents a malfunction and is reduced in power dissipation.

In order to attain the objects described above, according to an aspect of the present invention, there is provided a transmission and reception system for controlling a locking/unlocking operation of a key, comprising a transmission section for transmitting a control signal having a predetermined frequency for controlling a locking/unlocking operation of the key, and a reception section for receiving the control signal and effecting driving control of the key in response to the control signal, the reception section including a carrier detection circuit for detecting a frequency of the control signal, the reception section supplying, when the control signal is not received, power only to the carrier detection circuit.

With the transmission and reception system, since power is supplied to the entire reception section only when the carrier detection circuit detects the frequency of a control signal, power dissipation can be reduced and a malfunction which arises from an unnecessary signal can be prevented. Further, since power is supplied only when a door is to be locked or unlocked, power dissipation can be reduced and the reception section can have a simple construction without the requirement for complicated wiring lines for supplying power from the outside, and saving of the space can be achieved.

According to another aspect of the present invention, there is provided a transmission and reception system for controlling a locking/unlocking operation of a lock, comprising a transmission section for transmitting a control signal having a predetermined frequency for controlling a locking/unlocking of the key, and a reception section for receiving the control signal and effecting driving control of the key in response to the control signal, the reception section including detection means for detecting approach of a person, the reception section supplying, when approach of no person is detected, power only to the detection means.

With the transmission and reception system, since power is supplied to the entire reception section only when the detection means detects approach of a person, power dissipation can be reduced and a malfunction which arises from an unnecessary signal can be prevented. Further, since power is supplied only when a door is to be locked or unlocked, power dissipation can be reduced and the reception section can be constructed in a simple construction without the requirement for complicated wiring lines for supplying power from the outside, and saving of the space can be achieved.

According to a further aspect of the present invention, there is provided a transmission and reception system for controlling a locking/unlocking operation of a lock, comprising a transmission section for transmitting a control signal having a predetermined frequency for controlling a locking/unlocking operation of the key, and a reception section for receiving the control signal and effecting driving control of the key in response to the control signal, the reception section including a mechanism section for locking/unlocking the key, a control processing section for controlling the mechanism section, and a power supply including a battery, the mechanism section, the control processing section and the power supply being built in at a position of a door.

With the transmission and reception system, since the mechanism section, the control processing section and the power supply which form the reception section are built in the door, saving of the space can be achieved without complicating wiring lines.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
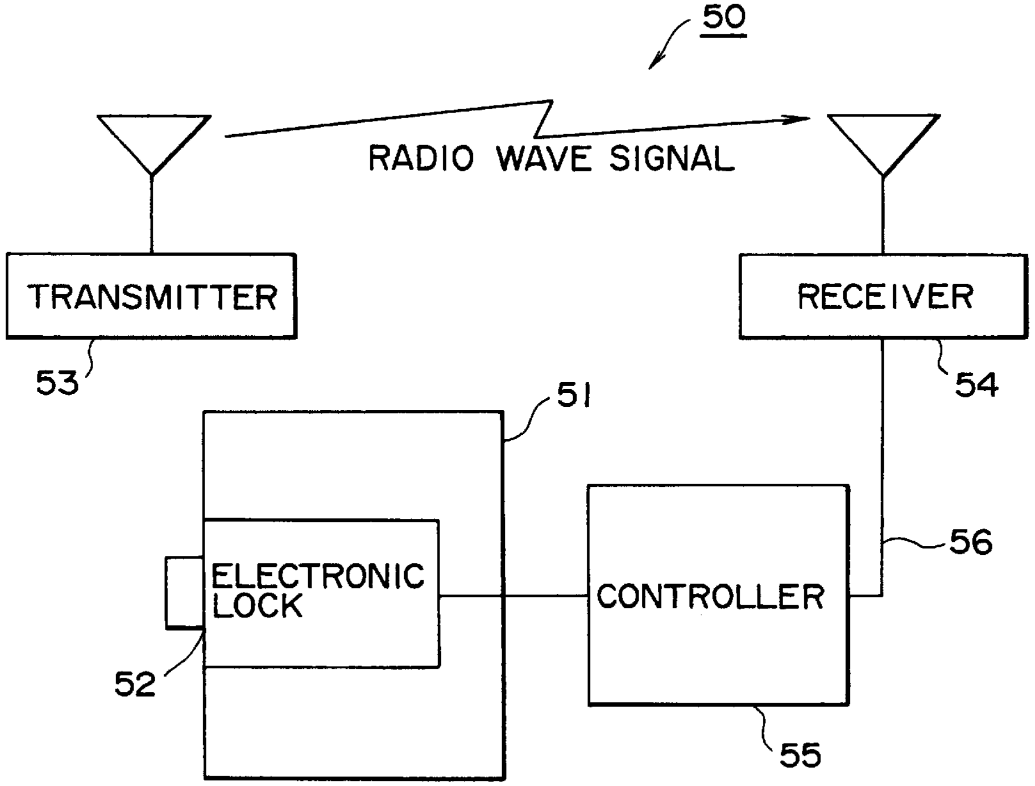
FIG. 1 PRIOR ART
FIG. 1 is a block diagram showing a typical remotely controlled lock apparatus.
Figure 2:
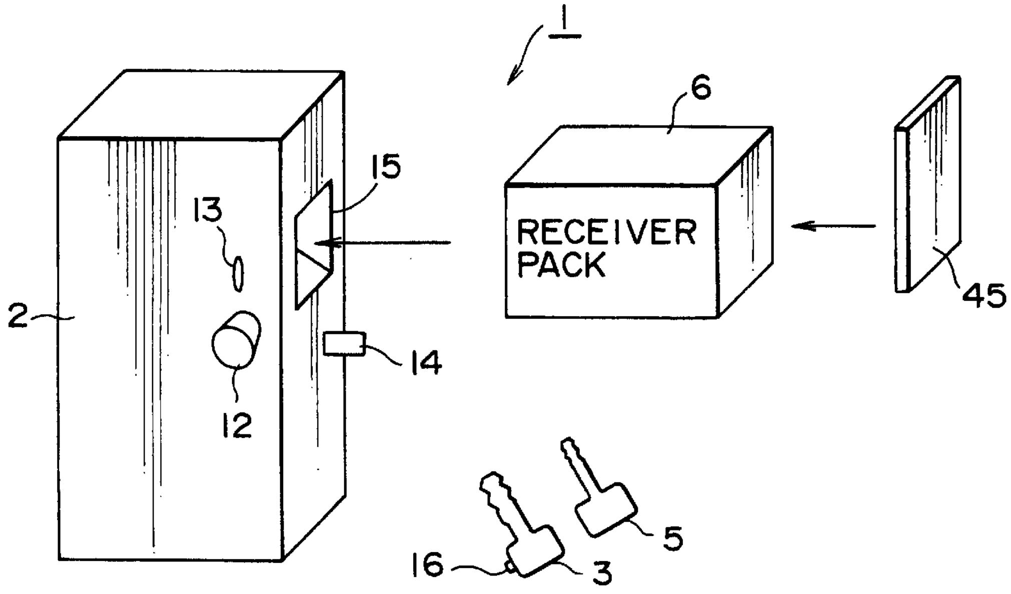
FIG. 2 is a schematic view of a transmission and reception system for controlling a locking/unlocking operation of a key showing a first preferred embodiment of the present invention.

Referring first to FIG. 2, there is shown a transmission and reception system according to a first preferred embodiment of the present invention. The transmission and reception system for controlling a locking/unlocking operation of a key is generally denoted at 1 and includes a door 2, a remote control key 3 serving as a transmission section, a mechanical key 5, a receiver pack 6 built in the door 2 and serving as a reception section, and a lid 45.

The door 2 is an ordinary door having an ordinary outer appearance and used for the porch, a room or the like of an ordinary house or the like, and is formed substantially in a parallelepiped as seen in FIG. 2. The door 2 includes a knob 12 for manual operation to open or close the door 2, a keyhole 13, a lock 14, an insertion opening 15 for the receiver pack 6. The lock 14 can be locked or unlocked by the remote control key 3 or the mechanical key 5.

Figure 3:
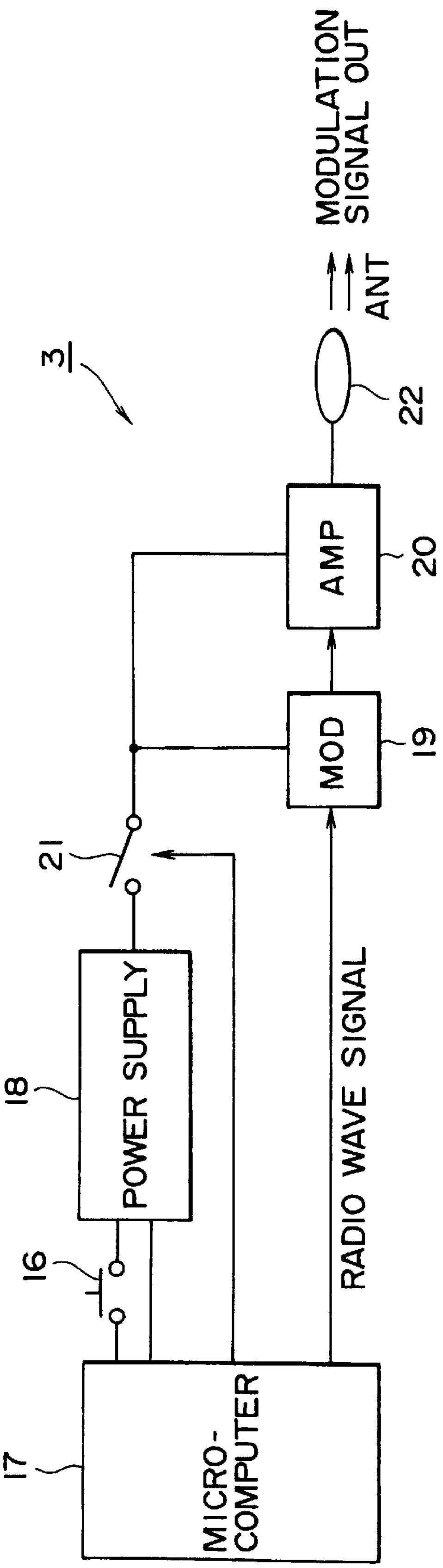
FIG. 3 is a block diagram of a remote control key of the transmission and reception system of FIG. 2.

Referring to FIGS. 2 and 3, the remote control key 3 includes a transmission button 16, a microcomputer 17, a power supply 18, a modulation circuit (MOD) 19, an amplification circuit (AMP) 20, a switch 21 for connecting the modulation circuit 19 and the amplification circuit 20 to the power supply 18, and a transmission antenna 22.

Figure 4:
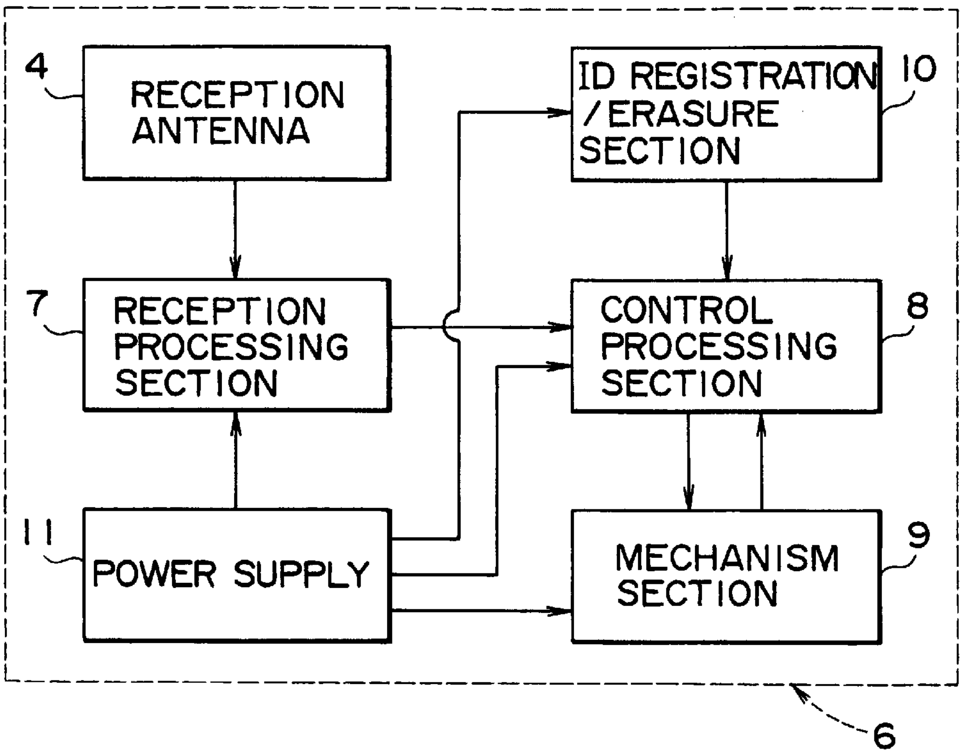
FIG. 4 is a block diagram of a receiver pack of the transmission and reception system of FIG. 2.

Referring to FIG. 4, the receiver pack 6 includes a reception processing section 7 to which a signal received by a reception antenna 4 is supplied, a control processing section 8 to which a signal from the reception processing section 7 is supplied, and a mechanism section 9 which is controlled by a signal from the control processing section 8. Further, the receiver pack 6 includes an ID registration/erasure section 10 connected to the control processing section 8. Power is supplied from a power supply 11 to the components of the receiver pack 6.

Figure 5:
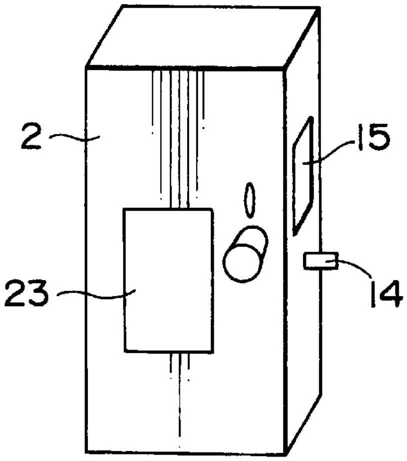
FIG. 5 is a schematic view of a door to which the transmission and reception system of FIG. 2 is applied.

The reception antenna 4 may be provided, for example, on the knob 12 of the door 2, the lid 45 of the receiver pack 6, the lock 14 or the like as seen in FIG. 2. Or, a film antenna 23 may be adhered to the door 2 as seen in FIG. 5, or though not shown, the film antenna 23 may be built in the inside of the door 2. Since the reception antenna 4 and the door 2 are electrically connected to each other in the inside of the door 2 in this manner, wiring lines are unnecessary, and the construction can be simplified.

In operation, if the transmission button 16 is depressed, then power is supplied to the microcomputer 17. Then, the microcomputer 17 closes the switch 21 and develops a radio wave signal. The radio wave signal is modulated by the modulation circuit 19 and amplified by the amplification circuit 20. Then, the modulation signal for controlling locking/unlocking of the lock 14 (refer to FIG. 2) is transmitted from the transmission antenna 22.

The control signal is a radio wave signal including an identification code ID stored in advance in the microcomputer 17. This modulation signal is received by the reception antenna 4 (refer to FIG. 4) and supplied to the reception processing section 7, by which the modulation signal is demodulated. The identification code ID included in the demodulated signal is supplied to the control processing section 8. The control processing section 8 compares the identification code ID stored in advance therein and the identification code ID supplied thereto from the reception processing section 7 with each other. When a result of the comparison proves coincidence, locking or unlocking is performed. Or, it is otherwise possible to insert the remote control key 3 directly into the keyhole 13 of the door 2 and turn it to effect locking or unlocking in a conventional manner.

The mechanical key 5 is a key used usually and having no signal transmission function, and can perform a locking or unlocking operation if it is inserted into the keyhole 13 and turned.

Figure 6A:
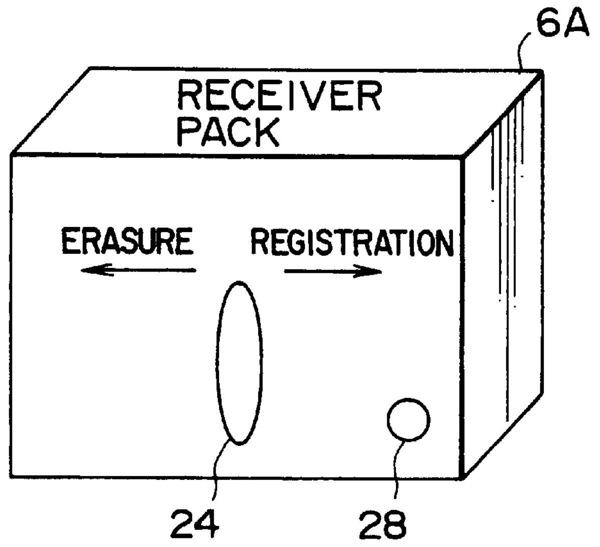
FIGS. 6A and 6B are schematic views showing different receiver packs for use with the transmission and reception system of FIG. 2.
Figure 6B:
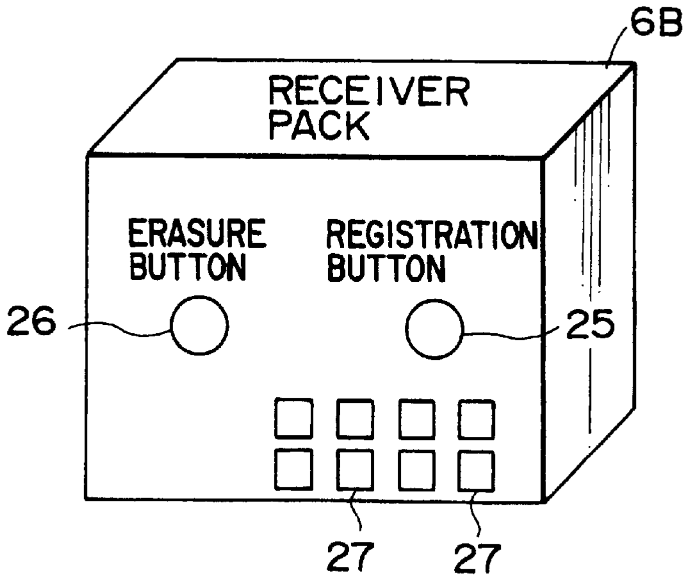

FIGS. 6A and 6B show different constructions of the receiver pack 6. As described hereinabove, the insertion opening 15 for inserting the receiver pack 6 is provided on a side face of the door 2. The receiver pack 6 is inserted into the insertion opening 15, and the insertion opening 15 is closed up with the lid 45, whereafter the receiver pack 6 is secured by means of screws or the like not shown.

The receiver pack 6 has a function of registering/erasing identification code ID data for identification of whether the remote control key 3 conforms to the door 2, that is, an identification code ID registration/erasure section 10 (refer to FIG. 4). For example, the receiver pack 6A shown in FIG. 6A has an operation hole 24 formed therein such that the remote control key 3 or the mechanical key 5 may be inserted into it. Meanwhile, the receiver pack 6B shown in FIG. 6B has a registration button 25 and an erasure button 26 provided thereon. Below the registration button 25 and the erasure button 26, light emitting diodes (LEDs) 27 for indicating the registered number of identification code ID data are provided, and a plural number of identification code ID data equal to the number of the LEDs 27 can be registered.

When identification code ID data are to be registered using the receiver pack 6A shown in FIG. 6A, the remote control key 3 is inserted into the operation hole 24 and turned clockwise, and then the transmission button 16 (refer to FIG. 2) or a completion button 28 is depressed. Consequently, the identification code ID data stored in the microcomputer 17 of the remote control key 3 in advance can be registered into the control processing section 8 of the receiver pack 6A by transmission of a radio wave signal emitted from the remote control key 3 or else by the electric connection between the receiver pack 6A and the remote control key 3.

In order to erase identification code ID data, the remote control key 3 is inserted and turned counterclockwise, and then the operation button 16 or the completion button 28 is depressed in a similar manner as upon registration. Consequently, the identification code ID data stored in the control processing section 8 of the receiver pack 6A in advance can be erased by a radio wave signal emitted from the remote control key 3 or else by the electric connection between the receiver pack 6A and the remote control key 3.

The operation for registration or erasure of identification code ID data may be performed by inserting the remote control key 3 into the operation hole 24 in a state wherein the receiver pack 6A is removed from the door 2. Consequently, registration or erasure of the registration code ID data of the receiver pack 6A can be performed only by an owner of the remote control key 3. Since an outsider cannot register or erase the identification code ID data, the security of the transmission system for controlling locking/unlocking of the key can be anticipated.

In order to register identification code ID data using the receiver pack 6B shown in FIG. 6B, the registration button 25 is depressed to establish a registration mode, and the transmission button 16 (refer to FIG. 2) of the remote control key 3 is depressed to send a radio wave signal. Then, the registration button 25 is depressed again. In response to the depression, the identification code ID data are registered into the control processing section 8 of the receiver pack 6.

In order to erase the identification code ID data, the erasure button 26 is depressed to establish an erasure mode, and the operation button 16 (refer to FIG. 2) of the remote control key 3 is depressed to send a radio wave signal. Then, the erasure button 26 is depressed again. In response to the depression, the identification code ID data registered in the control processing section 8 of the receiver pack 6B in advance are erased.

The operation for registration or erasure of identification code ID data is performed in a state wherein the receiver pack 6B is removed from the door 2. A number of ones of the LEDs 27 equal to the number of registered identification code ID data (that is, the number of remote control keys) are lit. In other words, a plurality of remote control keys 3 can be registered into a single receiver pack 6.

Registration or erasure of the identification code ID data of the receiver pack 6B is performed in a state wherein the lid 45 secured by means of screws or the like is removed and the receiver pack 6B is removed from the door 2. Since an outsider cannot register or erase identification code ID data readily, the security of the transmission system for controlling locking/unlocking of the key can be achieved.

It is to be noted that, if the receiver pack 6 (6A, 6B) is provided with a voice guide function so that, for example, upon opening or closing of the door 2, upon erasure or registration of identification code ID data or the like, voice or sound of a buzzer is used for guidance, then operation can be performed while confirming opening or closing of the door 2, registration or erasure of identification code ID data or the like. Further, when the power supply 18 for the remote control key 3 or the power supply 11 for the receiver pack 6 is disconnected, if this is reported by voice, buzzer sound or the like, then it can be recognized immediately that the operation is disabled by consumption of the battery, and the apparatus can be used conveniently.

Figure 7:
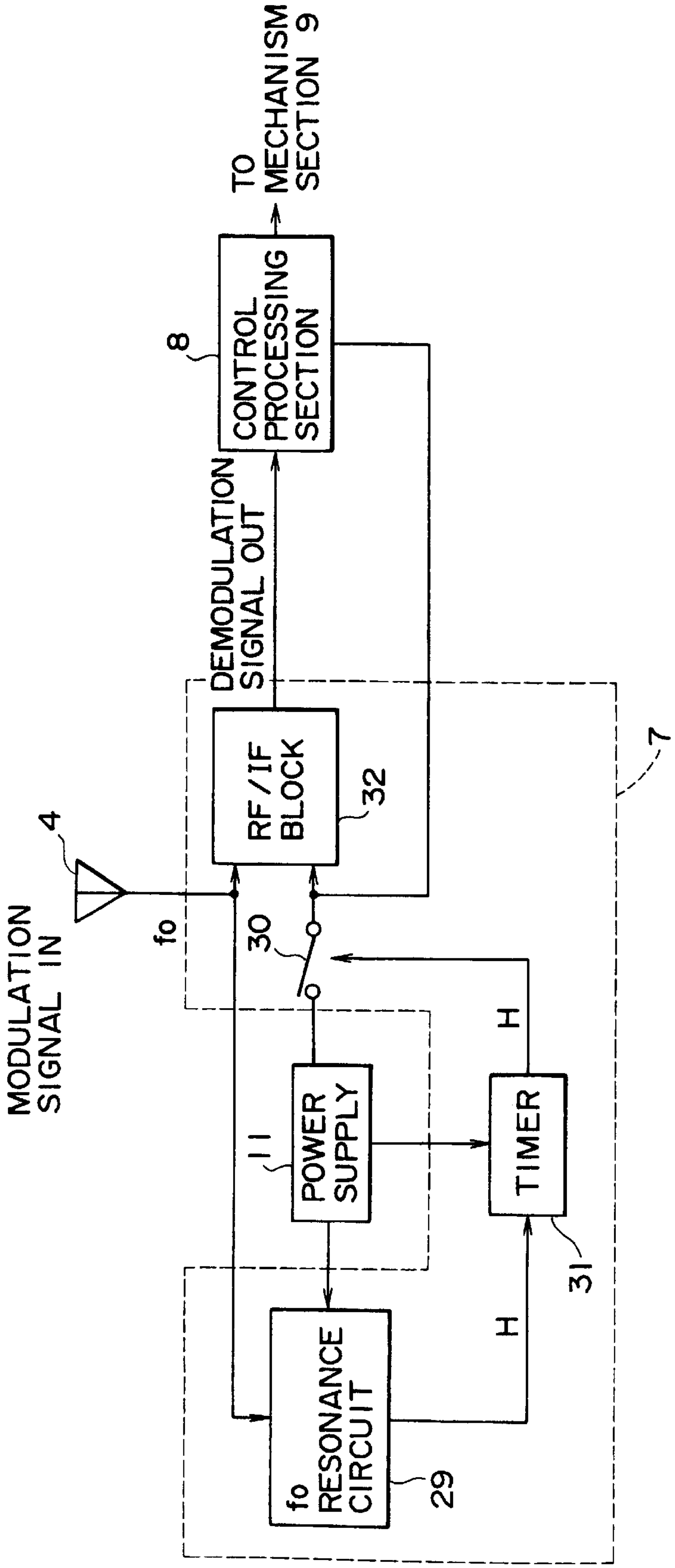
FIG. 7 is a block diagram showing part of the receiver pack of FIG. 4.

Referring to FIG. 7, the reception processing section 7 includes a resonance circuit 29 serving as a carrier detection circuit for detecting a predetermined reference frequency fo, a switch 30 for changing over the power supply 11 between supply/stop, a timer 31 for closing the switch 30 for a fixed period of time, and an RF (Radio Frequency)/IF (Intermediate Frequency) block 32.

The resonance circuit 29 normally receives power from the power supply 11 and outputs, when a radio wave signal from the remote control key 3 is received via the antenna 4, a high level signal (H) to the timer 31. The timer 31 outputs, in response to the high level signal (H), a change-over signal to put and keep the switch into and in an on-state for a fixed period of time to control the switch 30. The RF/IF block 32 receives power from the power supply 11 only when the switch 30 is in an on-state.

Alternatively, the timer 31 may turn the switch 30 on and off so that power may be intermittently supplied to the entire reception processing section 7 to receive a control signal. In this instance, when a control signal is received, power is continuously supplied for the fixed period of time to effect a driving operation by the control signal.

Since the power supply 11 is connected to the RF/IF block 32, control processing section 8 and so forth only for the fixed period of time for reception of a control signal in this manner, saving of power can be achieved, and a malfunction which arises from reception of another signal can be prevented.

The reception processing section 7 demodulates, by the RF/IF block 32 thereof, a modulation signal received by the reception antenna 4, and outputs a demodulated identification code ID to the control processing section 8.

The control processing section 8 discriminates whether or not an identification code ID of a control signal sent thereto is coincident with identification code ID data registered in advance. If they are coincident with each other, then the control processing section 8 discriminates that the remote control key 3 should be used with the door 2 and sends a key opening or closing signal to the mechanism section 9. On the contrary if the identification code ID and the identification code ID data are not coincident with each other, then the control processing section 8 discriminates that the remote controller key is not for the door 2, and does not send a key opening or closing signal to the mechanism section 9.

Figure 8:
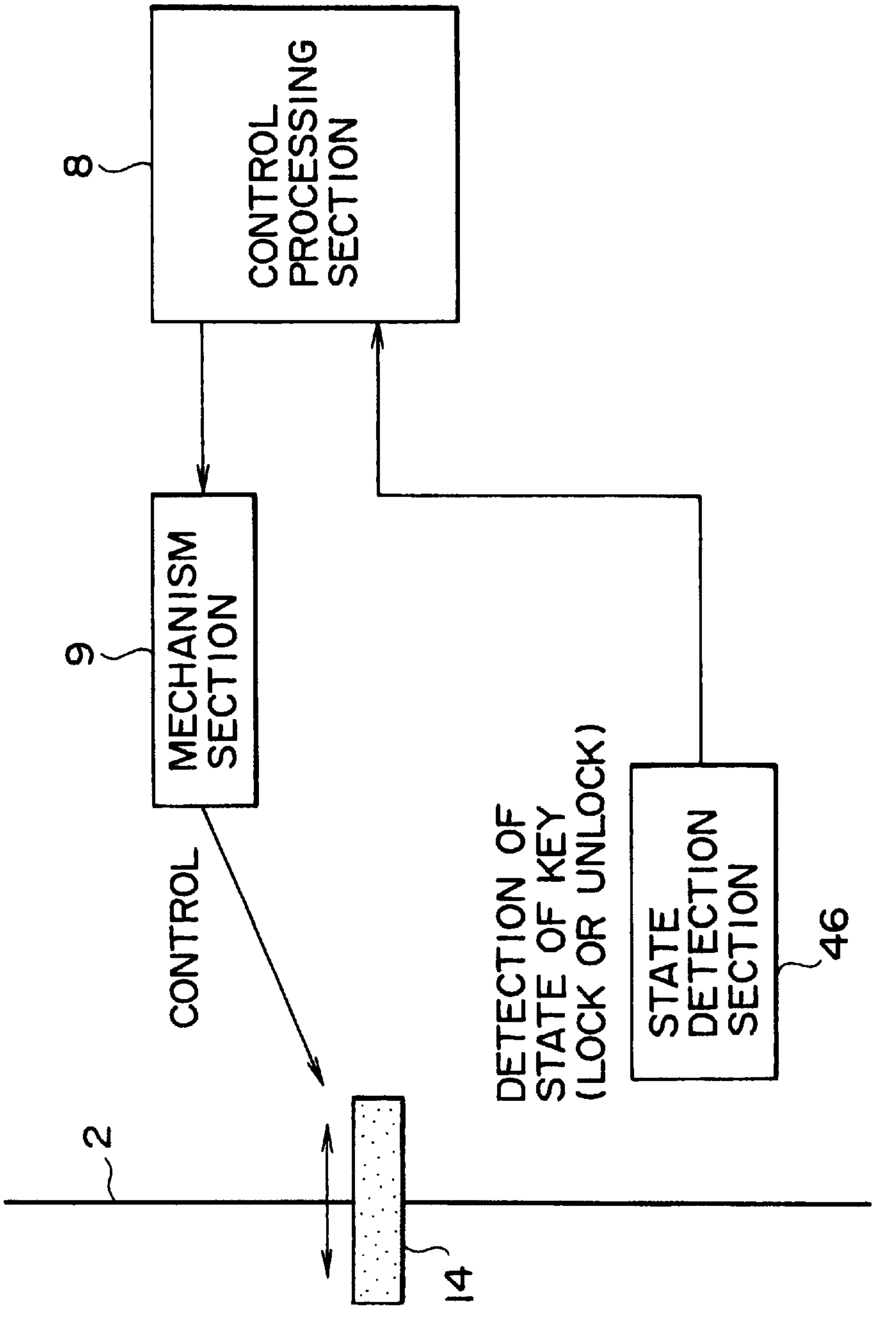
FIG. 8 is a block diagram illustrating locking/unlocking of a lock of the transmission and reception system of FIG. 2.

If the mechanism section 9 receives a key opening or closing signal as seen in FIG. 8, then it moves the lock 14 leftwardly or rightwardly to effect locking or unlocking. Further, a state detection section 46 for detecting the state of the lock 14, that is, whether or not the lock 14 is in a locked state or an unlocked state, is provided, and sends a detection signal to the control processing section 8.

For example, if a control signal, that is, a Lock signal, is received from the remote control key 3 in a state wherein the lock 14 is not locked, then the control processing section 8 sends a key opening or closing signal (Lock) to the mechanism section 9. Thereafter, the state detection section 46 detects whether or not the second state of the lock 14 exhibits a change in state before and after the reception of the signal, that is, whether or not the lock 14 is in a state as indicated by the instruction of the control signal. Then, the state detection section 46 sends a detection signal, that is, a state signal, to the control processing section 8. If the lock 14 exhibits a change in state before and after the reception of the signal, that is, if the lock 14 is in a locked state, then the control processing section 8 stops sending the key opening or closing signal to the mechanism section 9. On the other hand, where the lock 14 does not exhibit a change in state because the door 2 is left open or the like, the control processing section 8 continues to send the key opening or closing signal to the mechanism section 9 until the door 2 is closed and locked by the lock 14.

Since the state detection section 46 for confirming that the lock 14 is in a state as indicated by an instruction of a control signal is provided in this manner, a locking or unlocking operation can be confirmed with certainty.

The power supply 11 serves as a power supply to the reception processing section 7, control processing section 8, mechanism section 9, identification code ID registration/erasure section 10 and so forth, and a dry cell, a rechargeable battery or the like is used for the power supply 11. Supply of power from the power supply 11 to the RF/IF block 32 and the control processing section 8 is changed over by the switch 30 (refer to FIG. 7) to achieve saving of power. Accordingly, power can be supplied sufficiently by means of a dry cell, a rechargeable battery or the like, and complicated wiring lines or the like for supplying AC power from the outside of the door are not required.

Subsequently, a transmission and reception system 1A for controlling a locking/unlocking operation of a key according to a second embodiment of the present invention will be described.

Figure 9A:
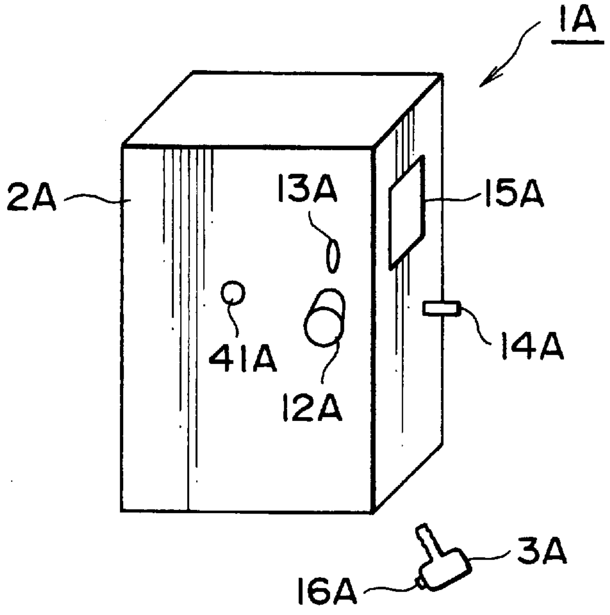
FIGS. 9A and 9B are perspective views of transmission and reception systems for controlling a locking/unlocking operation of a key showing a second preferred embodiment of the present invention.
Figure 9B:
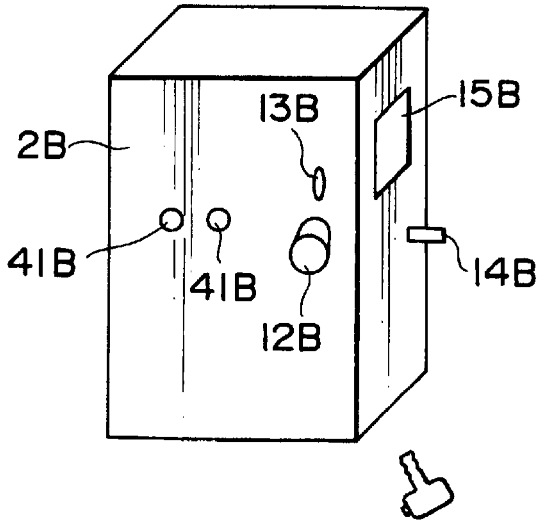

A sensor 41A or 41B for detecting approach of a person is provided on the front face of a door 2A or 2B as shown in FIG. 9A or 9B. For example, a pyroelectric sensor is used for the sensor 41A or 41B. Since a pyroelectric sensor can detect a small temperature variation as electric current, it is used widely for detection of infrared rays.

Figure 10A:
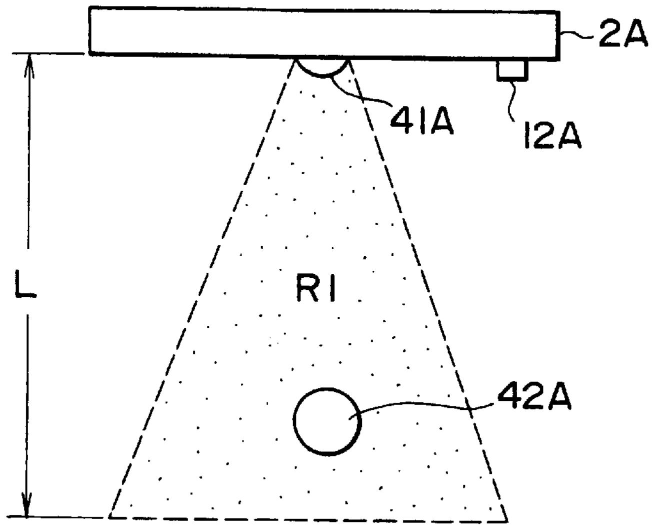
FIGS. 10A and 10B are diagrammatic views illustrating ranges of detection of sensors of the transmission and reception systems of FIGS. 9A and 9B, respectively.
Figure 10B:
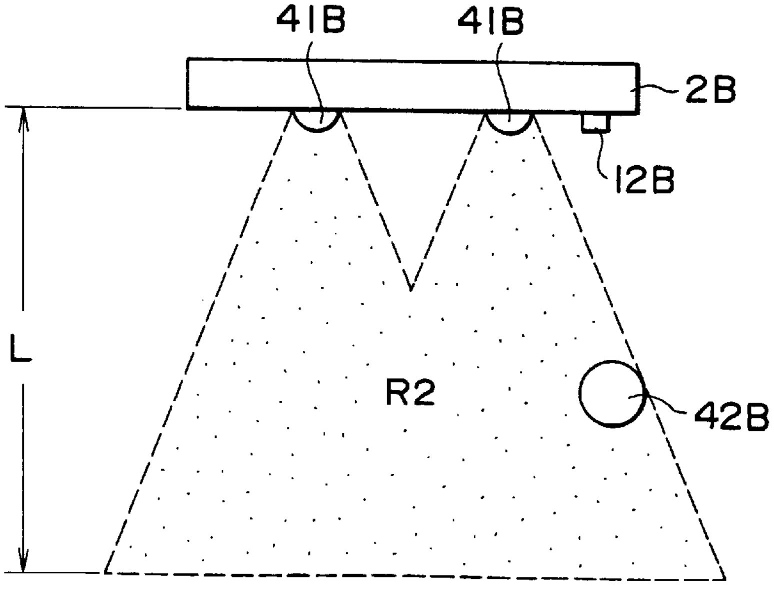

At least one sensor 41A or 41B is provided on the door 2A or 2B and is located such that, when a person approaches the door 2A or 2B, it can detect the person. For example, where the single sensor 41A is provided on the door 2A as shown in FIG. 9A, when a person 42A comes near to a predetermined distance L to the door 2A and is within a range R1 as seen in FIG. 10A, the sensor 41A can detect the person 42A. On the other hand, where the two sensors 41B are provided on the door 2B as shown in FIG. 9B, they can detect a person 42B if the person 42B is within a wider range R2 as seen in FIG. 10B.

Figure 11:
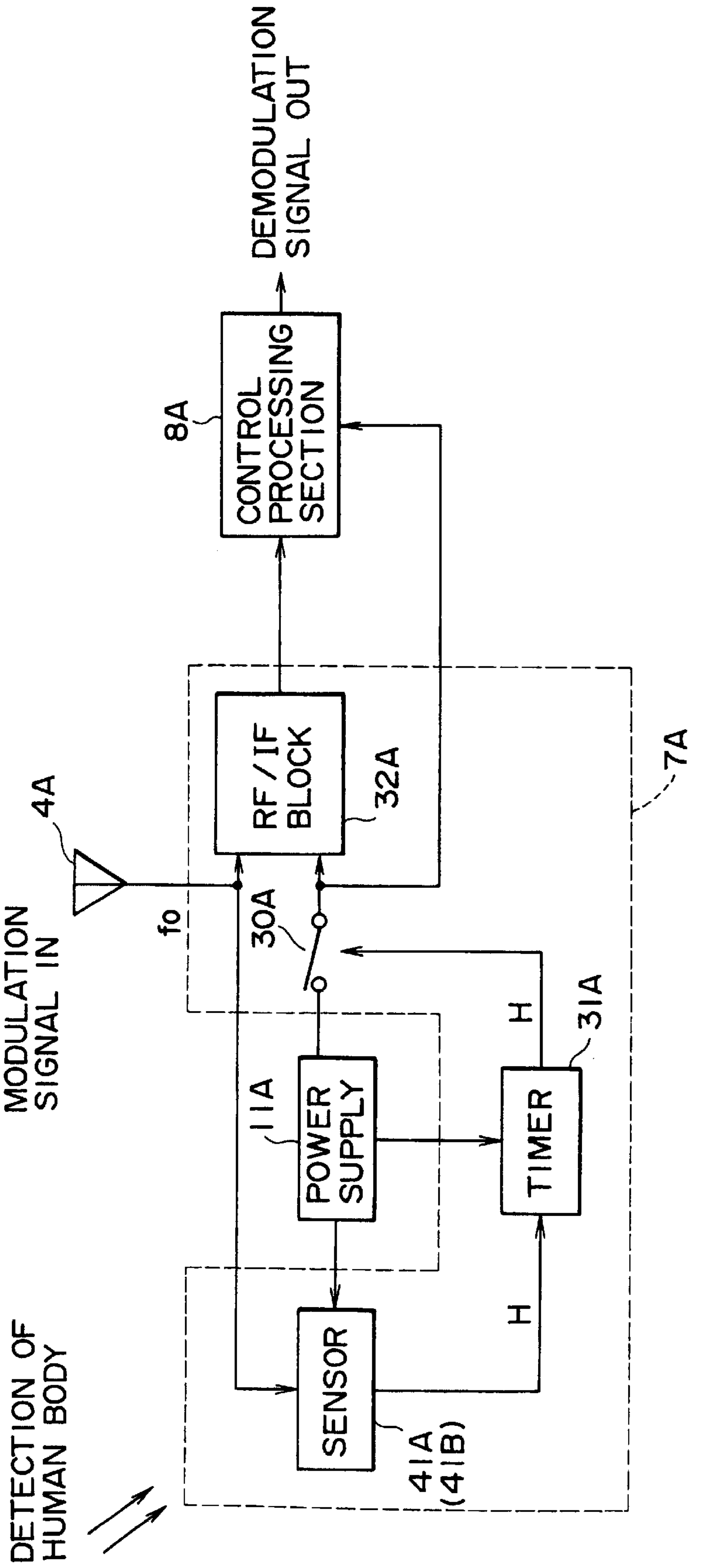
FIG. 11 is a block diagram showing part of a receiver pack for use with the transmission and reception systems of FIGS. 9A and 9B.

A reception processing section 7A includes, as shown in FIG. 11, a sensor 41A (41B), a timer 31A, a switch 30A and an RF/IF block 32A. The sensor 41A (41B) and the timer 31A are held in normal connection to a power supply 11A. The RF/IF block 32A, a control processing section 8A and so forth and the power supply 11A are controlled depending upon "HIGH" or "LOW" of a signal sent thereto from the timer 31A similarly as in the first embodiment and are in a normally disconnected state from each other.

Subsequently, operation of the transmission and reception system 1A for controlling a locking/unlocking operation of a key of the second embodiment having the construction described above will be described.

If a person 42A (42B) approaches the door 2A (2B) so that the sensor 41A (41B) detects the person 42A (42B), then the sensor 41A (41B) outputs a "HIGH" signal to the timer 31A.

When the "HIGH" signal is received, the timer 31A turns the switch 30A on for a fixed period of time to connect the RF/IF block 32A, control processing section 8A and so forth to the power supply 11A. Consequently, the RF/IF block 32A and the control processing section 8A output an identification code ID demodulated from a modulation signal received by a reception antenna 4A.

Figure 12:
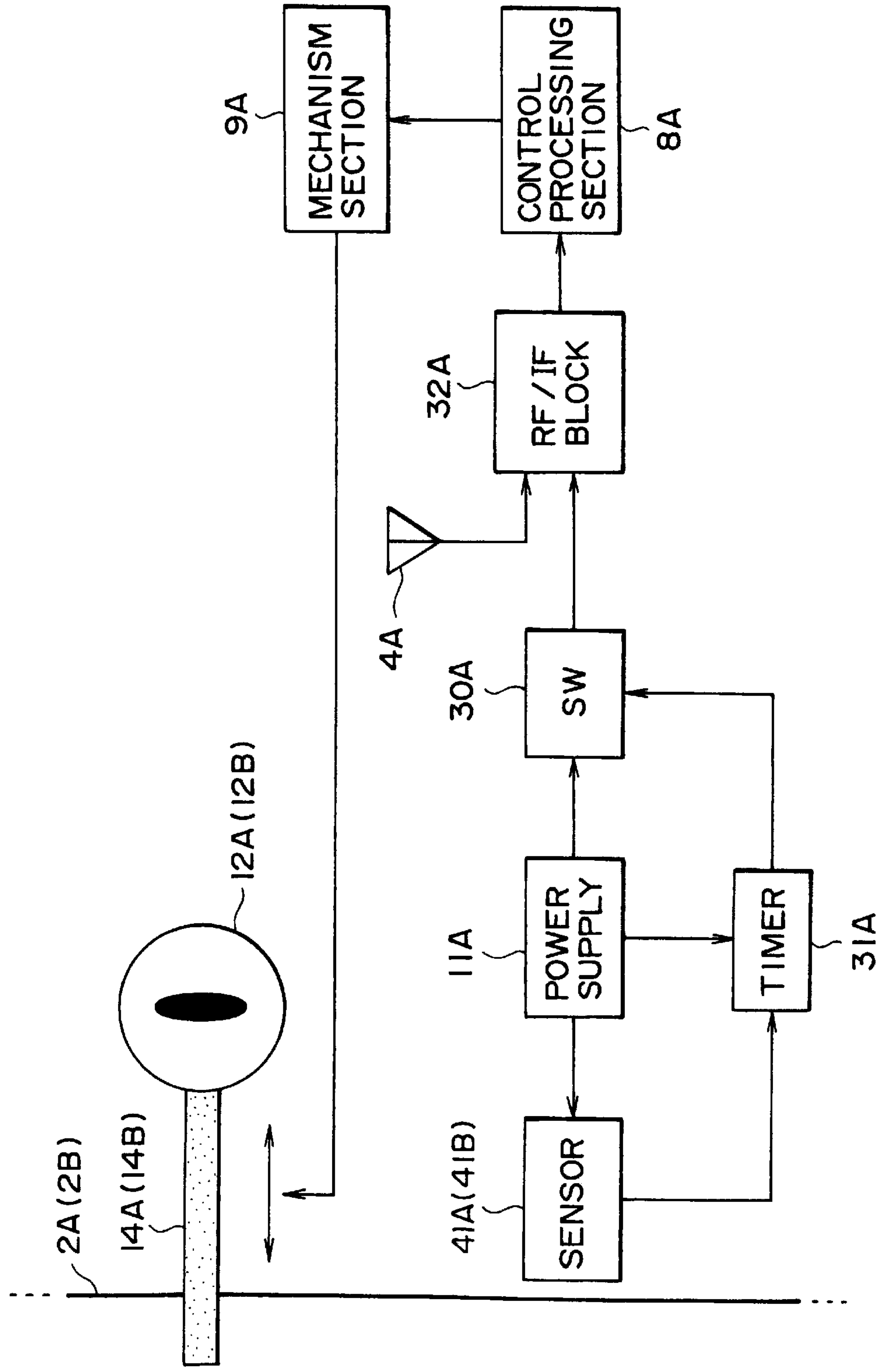
FIG. 12 is a block diagram illustrating locking/unlocking of a lock in the transmission and reception systems of FIGS. 9A and 9B.

The control processing section 8A recognizes whether or not an identification code ID sent thereto from the reception processing section 7A and identification code ID data set therein are coincident with each other. If they are coincident with each other, then the control processing section 8A sends a key opening or closing signal to a mechanism section 9A to lock or unlock the lock 14A (14B) as seen in FIG. 12.

Since the power supply 11A is connected to the RF/IF block 32A, control processing section 8A and so forth only for a fixed period of time after a person is detected in this manner, saving of power can be achieved, and a malfunction which arises from reception of another signal can be prevented.

Subsequently, a transmission and reception system 1C for controlling a locking/closing operation of a key according to a third preferred embodiment of the present invention will be described.

Figure 13A:
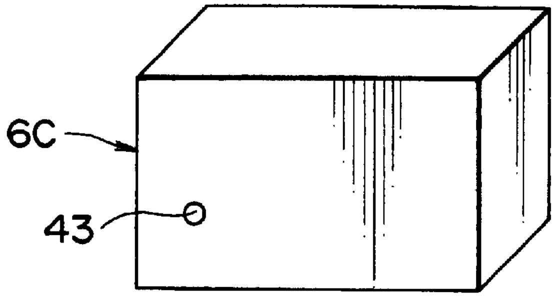
FIGS. 13A and 13B are schematic views of a transmission and reception system for controlling a locking/unlocking operation of a key showing a third preferred embodiment of the present invention.
Figure 13B:
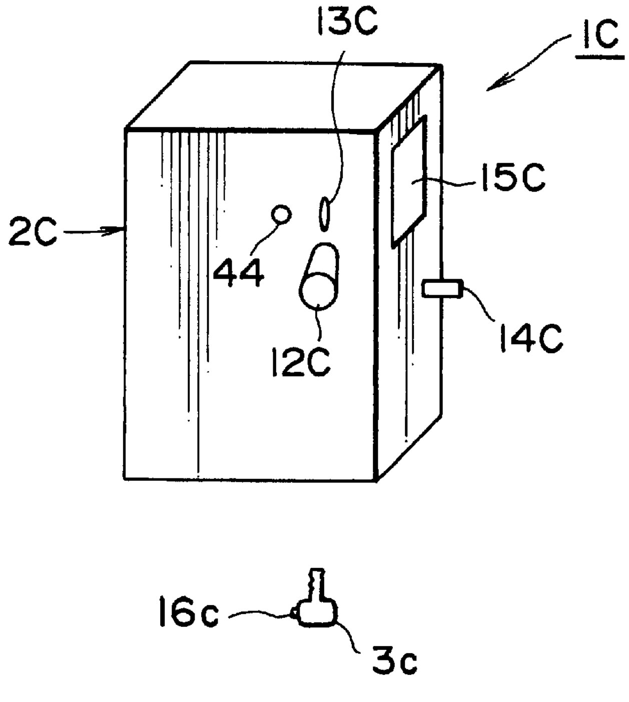

A receiver pack 6C includes an infrared ray sensor 43 for receiving an infrared ray as shown in FIG. 13A. As shown in FIG. 13B, a door 2C has a hole 44 formed therein such that, if the receiver pack 6C is inserted through an insertion opening 15C, then the infrared ray sensor 43 is exposed through the hole 44.

Figure 14:
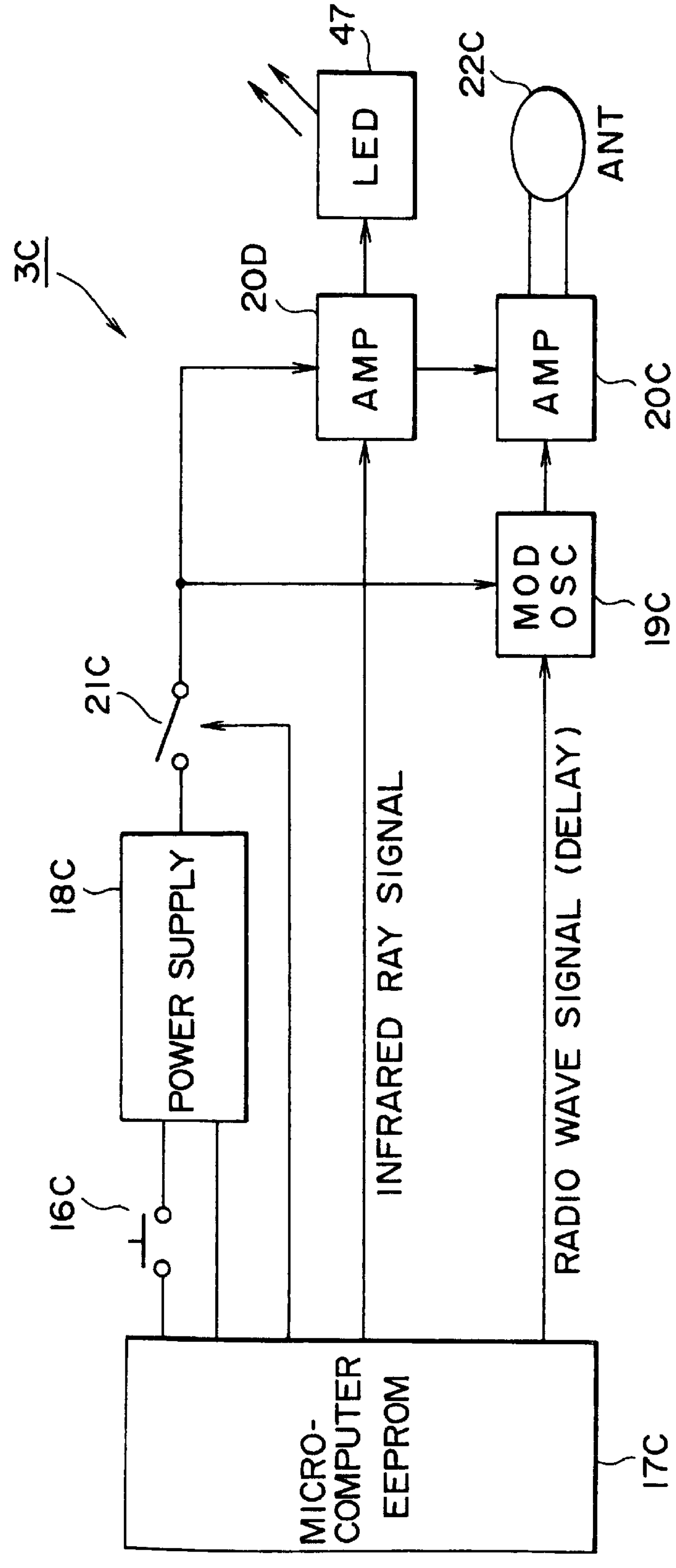
FIG. 14 is a block diagram of a remote control key of the transmission and reception system of FIGS. 13A and 13B.

A remote control key 3C includes, as shown in FIG. 14, a transmission button 16C, a microcomputer 17C for generating an infrared ray signal and a radio wave signal, a power supply 18C, a modulation circuit (MOD OSC) 19C, first and second amplification circuits (AMP) 20D and 20C, a switch 21C for changing over the connections between the modulation circuit 19C and first and second amplification circuits circuit 20D and 20C and the power supply 18C, a light emitting diode (LED) 47, and a transmission antenna 22C.

If the transmission button 16C is depressed, then the switch 21C is closed, and an infrared ray signal is generated from the microcomputer 17C and then a radio wave signal is generated. The infrared ray signal is amplified by the first amplification circuit 20D. Then, the infrared ray signal is transmitted as an infrared ray signal from the LED 47. Meanwhile, the radio wave signal is modulated by the modulation circuit 19C and amplified by the second amplification circuit 20C. Then, the radio wave signal is transmitted as a modulation signal from the transmission antenna 22C.

Figure 15:
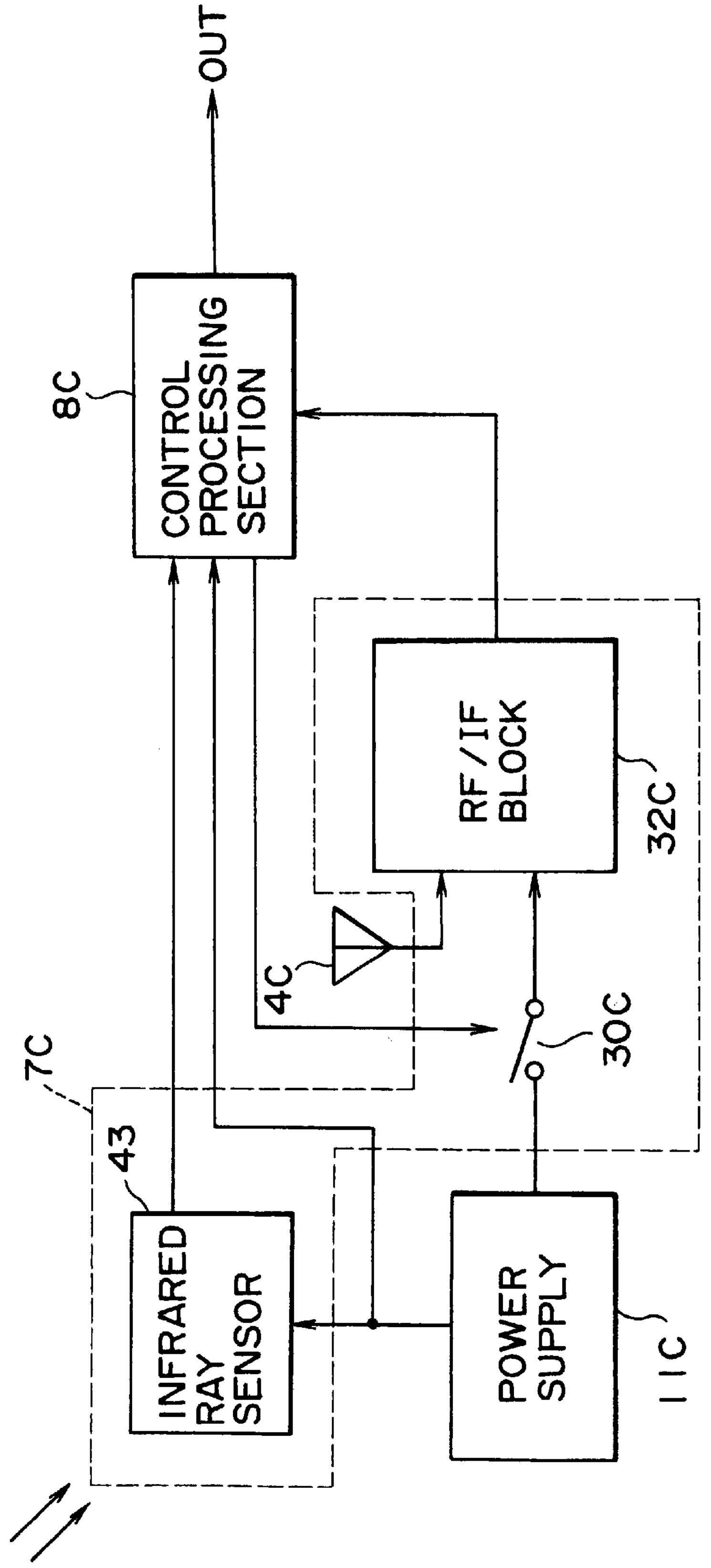
FIG. 15 is a block diagram showing part of a receiver pack of the transmission and reception system of FIGS. 13A and 13B.

A reception processing section 7C includes, as shown in FIG. 15, an infrared ray sensor 43, a switch 30C and an RF/IF block 32C. The sensor 43 and a control processing section 8C are held in normal connection to the power supply 11C. The RF/IF block 32C is connected to the power supply 11C when the infrared ray sensor 43 receives an infrared ray signal, but is normally held in a disconnected state.

Subsequently, operation of the third embodiment having such a construction as described above will be described.

If the transmission button 16C of the remote control key 3C is depressed, then an amplified infrared ray signal is emitted from the LED 47. The infrared ray signal is detected by the infrared ray sensor 43.

When the infrared ray sensor 43 detects the infrared ray signal, it sends a detection signal to the control processing section 8C. The control processing section 8C thus turns the switch 30C on for a fixed period of time to supply power to the RF/IF block 32C. The RF/IF block 32C outputs a radio wave signal received by a reception antenna 4C as a demodulation signal.

Figure 16:
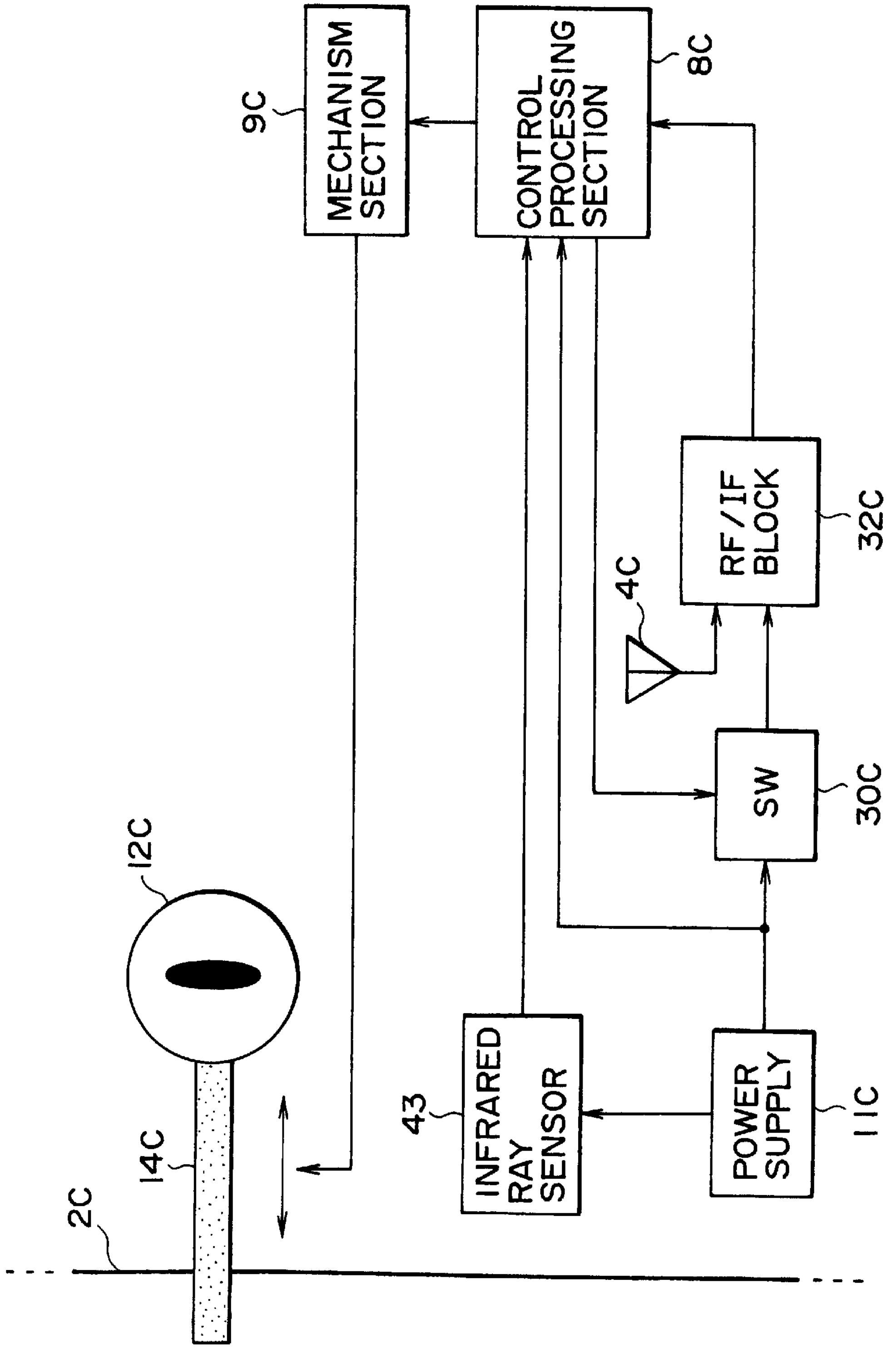
FIG. 16 is a block diagram illustrating locking/unlocking of a lock in the transmission and reception system of FIGS. 13A and 13B.

The control processing section 8C confirms whether or not an identification code ID of a control signal sent thereto from the reception processing section 7C and identification code ID data set therein are coincident with each other, and if they are coincident with each other, then the control processing section 8C sends a key opening or closing signal to a mechanism section 9C to move the lock 14C to effect locking or unlocking as seen in FIG. 16.

By transmitting two kinds of signals, for example, an infrared ray signal and a radio wave signal, with a time interval interposed therebetween in this manner, when the infrared ray signal is received, the power supply 11C is connected to the RF/IF block 32C, and then the radio wave signal sent out subsequently to the infrared ray signal is demodulated. Consequently, saving of power can be achieved, and a malfunction which arises from reception of another signal can be prevented.

Having now fully described the invention, it will be apparent to one of ordinary skill in the art that many changes and modifications can be made thereto without departing from the spirit and scope of the invention as set forth herein.

What is claimed is:

1. A transmission and reception system for controlling a locking/unlocking operation of an electronic lock mounted in a door, comprising:

a transmission unit for transmitting a control signal having a predetermined frequency for controlling a locking/unlocking operation of said electronic lock;

a reception unit for receiving the control signal and effecting driving control of said electronic lock in response to the control signal, wherein said reception unit includes a carrier detection circuit for detecting a frequency of the control signal and a mechanism unit for performing the locking/unlocking operation; and a power supply unit arranged in the door for supplying power to said carrier detection circuit and including a switch for selectively supplying power to said mechanism unit, wherein said power supply unit supplies power only to said carrier detection circuit when the control signal is not received and supplies power to said mechanism unit when the control signal is received.

2. The transmission and reception system for controlling a locking/unlocking operation of an electronic lock according to claim 1, wherein said reception unit further includes a timer for supplying power and effecting driving control of said electronic lock only for a fixed time after the control signal is received by said carrier detection circuit.

3. The transmission and reception system for controlling a locking/unlocking operation of an electronic lock according to claim 1, wherein said reception unit intermittently supplies power to said carrier detection circuit and, after the frequency of the control signal is received, continuously supplies power to said reception unit for a fixed period of time.

4. A transmission and reception system for controlling a locking/unlocking operation of a lock mounted in a door, comprising:

a transmission unit for transmitting a control signal having a predetermined frequency for controlling a locking/unlocking of said lock; and a reception unit for receiving the control signal and effecting driving control of said lock in response to the control signal, wherein said reception unit includes detection means for detecting an approach of a person and a mechanism unit for performing the locking/unlocking operation; and a power supply unit arranged in the door for supplying power to said detection means and including a switch for selectively supplying power to said mechanism unit, wherein said power supply unit supplies power only to said detection means when approach of a person is not detected and supplies power to said mechanism unit when approach of a person is detected.

5. A transmission and reception system for controlling a locking/unlocking operation of a lock according to claim 4, wherein said reception section further includes a timer for supplying power and effecting driving control of said lock only for a fixed period of time after approach of a person is detected by said detection means.

6. The transmission and reception system for controlling a locking/unlocking operation of a lock according to claim 4, wherein said detection means comprises a pyroelectric sensor.

7. A transmission and reception system for controlling a locking/unlocking operation of a lock mounted in a door, comprising:

a transmission unit for transmitting a control signal having a predetermined frequency for controlling a locking/unlocking operation of said lock; and a reception unit for receiving the control signal and effecting driving control of said lock in response to the control signal, wherein said reception unit includes a mechanism unit selectively powered by a power supply including a battery arranged in the door for locking/unlocking said lock, a control processing unit for controlling said mechanism unit, and a switch for connecting said mechanism unit to said battery when the control signal is received, wherein said reception unit, including said mechanism section, said control processing section and said power supply are integrated into the door controlled by said lock.

8. The transmission and reception system for controlling a locking/unlocking operation of a lock according to claim 7, wherein said reception unit is arranged in a casing of the door.

9. The transmission and reception system for controlling a locking/unlocking operation of a lock according to claim 7, wherein said reception unit further includes an identification code registration/erasure unit for registering or erasing an identification code peculiar to said transmission unit.

10. The transmission and reception system for controlling a locking/unlocking operation of a lock according to claim 9, wherein registration or erasure of the identification code is performed by said identification code registration/erasure unit upon receiving a second control signal from said transmission unit and an operation of a registration/erasure button provided for said reception unit.

11. The transmission and reception system for controlling a locking/unlocking operation of a lock according to claim 7, wherein said reception further includes an antenna for receiving the control signal, and wherein said antenna is formed as part of said door.

12. The transmission and reception system for controlling a locking/unlocking operation of a lock according to claim 7, wherein said reception unit further includes state detection means for detecting, when the control signal is received, a first state of said lock prior to the reception of the control signal and a second state of said lock after the reception of the control signal, and said control processing unit performs confirmation of operation of said mechanism unit in response to an output of said state detection means.

13. The transmission and reception system for controlling a locking/unlocking operation of a lock according to claim 7, further comprising a carrier detection circuit for detecting a frequency of the control signal and a power supply unit for supplying power to said carrier detection circuit and for selectively supplying power to said reception unit, wherein said power supply unit supplies power only to said carrier detection circuit when the control signal is not received.

14. The transmission and reception system for controlling a locking/unlocking operation of a lock according to claim 13, wherein said reception unit further includes a timer for supplying power and effecting driving control of said lock only for a fixed period of time after the control signal is received by said carrier detection circuit.

15. The transmission and reception system for controlling a locking/unlocking operation of a lock according to claim 7, further comprising detection means for detecting an approach of a person and a power supplying unit for supplying power to said detection means and for selectively supplying power to said reception unit, wherein said power supply unit supplies power only to said detection means when approach of a person is not detected.

16. The transmission and reception system for controlling a locking/unlocking operation of a lock according to claim 15, wherein said reception unit further includes a timer for supplying power and effecting driving control of said lock only for a fixed period of time after an approach of a person is detected by said detection means.

17. The transmission and reception system for controlling a locking/unlocking operation of a lock according to claim 15, wherein said detection means comprises a pyroelectric sensor.

18. The transmission and reception system for controlling a locking/unlocking operation of a lock according to claim 7, wherein the control signal from said transmission unit is formed from at least first and second control signals having different respective frequencies, and said control processing unit of said reception unit enables reception of the first control signal and supplies, when the first control signal is received, power for receiving the second control signal.

19. The transmission and reception system for controlling a locking/unlocking operation of a lock according to claim 18, wherein one of the first and second control signals is an infrared ray signal, and the other control signal is a radio wave signal.

* * * * *